(12) United States Patent
Yoo et al.

(10) Patent No.: US 12,542,100 B2
(45) Date of Patent: Feb. 3, 2026

(54) ELECTRONIC DEVICE, DISPLAY DEVICE, AND METHOD OF DRIVING THE DISPLAY DEVICE

(71) Applicant: Samsung Display Co., LTD., Yongin-si (KR)

(72) Inventors: Gi Na Yoo, Yongin-si (KR); Won Ju Kwon, Yongin-si (KR); Ji Eun Park, Yongin-si (KR); Hye Jung Park, Yongin-si (KR); Ju Kyung Jo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/031,787

(22) Filed: Jan. 18, 2025

(65) Prior Publication Data

US 2025/0391320 A1    Dec. 25, 2025

(30) Foreign Application Priority Data

Jun. 19, 2024    (KR) .................. 10-2024-0079273
Aug. 30, 2024    (KR) .................. 10-2024-0117621

(51) Int. Cl.
*G09G 3/32*    (2016.01)

(52) U.S. Cl.
CPC ........ *G09G 3/32* (2013.01); *G09G 2320/0233* (2013.01); *G09G 2320/0257* (2013.01); *G09G 2320/0276* (2013.01); *G09G 2320/0626* (2013.01); *G09G 2320/068* (2013.01); *G09G 2330/021* (2013.01); *G09G 2354/00* (2013.01)

(58) Field of Classification Search
CPC ............ G09G 3/32; G09G 2320/0233; G09G 2320/0257; G09G 2320/0276; G09G 2320/0626; G09G 2320/068; G09G 2330/021; G09G 2354/00
See application file for complete search history.

(56) References Cited

U.S. PATENT DOCUMENTS

| | | | |
|---|---|---|---|
| 5,489,918 A | * | 2/1996 | Mosier ................ G09G 3/3648 345/101 |
| 8,269,804 B2 | * | 9/2012 | Nishida ............... G09G 3/2003 345/694 |
| 9,368,057 B2 | * | 6/2016 | Kimpe .................. G09G 3/006 |

(Continued)

FOREIGN PATENT DOCUMENTS

| | | |
|---|---|---|
| KR | 101878201 B1 | 8/2018 |
| KR | 102279333 B1 | 7/2021 |

*Primary Examiner* — Gene W Lee
(74) *Attorney, Agent, or Firm* — CANTOR COLBURN LLP

(57) ABSTRACT

A display device includes: a processor configured to provide an input grayscale corresponding to an image; a display panel configured to display the image; an activity sensor configured to sense a current action of a user; and a viewing angle corrector configured to determine a current viewing angle of the user with respect to the display panel, wherein the current viewing angle corresponds to the current action, and correct the input grayscale based on the current viewing angle. The viewing angle corrector corrects the input grayscale, using a first offset for correcting a brightness change according to the current viewing angle and a second offset for correcting a color coordinate change according to the current viewing angle.

20 Claims, 11 Drawing Sheets

(56) References Cited

U.S. PATENT DOCUMENTS

| | | | | |
|---|---|---|---|---|
| 9,898,078 | B2* | 2/2018 | Peana | G09G 3/36 |
| 10,401,958 | B2* | 9/2019 | Peana | G09G 5/10 |
| 10,452,135 | B2* | 10/2019 | Files | G06F 3/1431 |
| 11,215,856 | B2* | 1/2022 | Byoun | G02F 1/1323 |
| 11,245,874 | B2 | 2/2022 | Jo | |
| 11,741,871 | B2* | 8/2023 | Peng | G09G 3/20 |
| | | | | 345/694 |
| 11,817,065 | B2* | 11/2023 | He | G06F 1/1652 |
| 11,887,550 | B2* | 1/2024 | Llull | G09G 5/026 |
| 2007/0291172 | A1* | 12/2007 | Kouzimoto | B60R 11/02 |
| | | | | 348/E13.044 |
| 2014/0146069 | A1* | 5/2014 | Tan | G06F 3/04845 |
| | | | | 345/589 |
| 2017/0031434 | A1* | 2/2017 | Files | G06F 3/1431 |
| 2017/0264851 | A1* | 9/2017 | Kuplevakhsky | |
| | | | | H04N 21/44218 |
| 2021/0063783 | A1* | 3/2021 | Byoun | B60K 35/654 |
| 2022/0014728 | A1* | 1/2022 | Deighton | G09G 3/03 |
| 2022/0375388 | A1* | 11/2022 | Kim | G09G 3/2003 |
| 2025/0139879 | A1* | 5/2025 | Tsuchiya | G06T 7/194 |
| 2025/0190159 | A1* | 6/2025 | Mitsumori | H04N 23/60 |

* cited by examiner

<FIRST COLOR>

<FIRST COLOR>

ELECTRONIC DEVICE, DISPLAY DEVICE, AND METHOD OF DRIVING THE DISPLAY DEVICE

This application claims priority to Korean Patent Application No. 10-2024-0079273, filed on Jun. 19, 2024, and Korean Patent Application No. 10-2024-0117621, filed on Aug. 30, 2024, and all the benefits accruing therefrom under 35 U.S.C. § 119, the contents of which in their entirety are herein incorporated by reference.

BACKGROUND

1. Field

The present disclosure generally relates to an electronic device, a display device, and a method of driving the display device.

2. Description of the Related Art

With the development of information technologies, the importance of a display device which is a connection medium between a user and information increases. Accordingly, display devices such as, for example, a liquid crystal display device and an organic light emitting display device are increasingly used.

When a user uses a mobile display device such as, for example, a smart watch, a smart phone, or tablet, the user may frequently views the display device while inclining the display device, as compared with a case where the user squarely views the display device. That is, the viewing angle of the user with respect to the display device is not frequently 0 degrees. There is a problem in that a brightness and a color coordinate of a display image may be viewed differently from a brightness and a color coordinate of an original image according to the viewing angle.

SUMMARY

Embodiments provide an electronic device, a display device, and a method of driving the display device, in which the brightness and color coordinate of an image viewed by a user can be equally maintained even when the viewing angle of the user with respect to a display panel varies.

In accordance with an aspect of the present disclosure, there is provided a display device including: a processor configured to provide an input grayscale corresponding to an image; a display panel configured to display the image; an activity sensor configured to sense a current action of a user; and a viewing angle corrector configured to determine a current viewing angle of the user with respect to the display panel, wherein the current viewing angle corresponds to the current action, and correct the input grayscale, based on the current viewing angle, wherein the viewing angle corrector corrects the input grayscale, using a first offset for correcting a brightness change according to the current viewing angle and a second offset for correcting a color coordinate change according to the current viewing angle.

The first offset may include a (1-1)th offset with respect to a first color, a (1-2)th offset with respect to a second color, and a (1-3)th offset with respect to a third color. The second offset may include a (2-1)th offset with respect to the first color, a (2-2)th offset with respect to the second color, and a (2-3)th offset with respect to the third color.

The display device may be configured to, as a luminance of the first color at the current viewing angle becomes larger, decrease the (1-1)th offset at the current viewing angle. The display device may be configured to, as a luminance of the second color at the current viewing angle becomes larger, decrease the (1-2)th offset at the current viewing angle. The display device may be configured to, as a luminance of the third color at the current viewing angle becomes larger, decrease the (1-3)th offset at the current viewing angle.

The display device may be configured to, as a luminance of the first color when a viewing angle is 0 degrees becomes larger, increase the (1-1)th offset at the current viewing angle. The display device may be configured to, as a luminance of the second color when the viewing angle is 0 degrees becomes larger, increase the (1-2)th offset at the current viewing angle. The display device may be configured to, as a luminance of the third color when the viewing angle is 0 degrees becomes larger, increase the (1-3)th offset at the current viewing angle.

The display device may be configured to, as a luminance ratio of the first color in the entire luminance when the viewing angle is 0 degrees becomes larger, decrease the (2-1)th offset at the current viewing angle. The display device may be configured to, as a luminance ratio of the second color in the entire luminance when the viewing angle is 0 degrees becomes larger, decrease the (2-2)th offset at the current viewing angle. The display device may be configured to, as a luminance ratio of the third color in the entire luminance when the viewing angle is 0 degrees becomes larger, decrease the (2-3)th offset at the current viewing angle.

The display device may be configured to, as a luminance ratio of the first color in the entire luminance at the current viewing angle becomes larger, increase the (2-1)th offset at the current viewing angle. The display device may be configured to, as a luminance ratio of the second color in the entire luminance at the current viewing angle becomes larger, increase the (2-2)th offset at the current viewing angle. The display device may be configured to, as a luminance ratio of the third color in the entire luminance at the current viewing angle becomes larger, increase the (2-3)th offset at the current viewing angle.

The viewing angle corrector may include: a viewing angle determiner configured to determine the current viewing angle corresponding to the current action; and an offset determiner configured to calculate the first offset and the second offset, based on the current viewing angle, and determine a final offset, based on the first offset and the second offset.

A plurality of representative viewing angles corresponding to a plurality of action groups may be predetermined. The viewing angle determiner may be configured to determine, as the current viewing angle, a representative viewing angle corresponding to an action group to which the current action belongs.

The offset determiner may determine, as the final offset, a value obtained by multiplying the first offset and the second offset.

The viewing angle corrector may further include: a grayscale-voltage converter configured to convert the input grayscale into an input voltage value; and an offset applier configured to generate an output voltage value by applying the final offset to the input voltage value.

In accordance with another aspect of the present disclosure, there is provided a method of driving a display device, the method including: sensing a current action of a user; determining a current viewing angle of the user with respect to a display panel, wherein the current viewing angle corresponds to the current action; and correcting an input grayscale of the display panel, based on the current viewing angle, wherein, in the correcting the input grayscale, the input grayscale is corrected, using a first offset for correcting a brightness change according to the current viewing angle and a second offset for correcting a color coordinate change according to the current viewing angle.

The first offset may include a (1-1)th offset with respect to a first color, a (1-2)th offset with respect to a second color, and a (1-3)th offset with respect to a third color. The second offset may include a (2-1)th offset with respect to the first color, a (2-2)th offset with respect to the second color, and a (2-3)th offset with respect to the third color.

The method may include, as a luminance of the first color at the current viewing angle becomes larger, decreasing the (1-1)th offset at the current viewing angle. The method may include, as a luminance of the second color at the current viewing angle becomes larger, decreasing the (1-2)th offset at the current viewing angle. The method may include, as a luminance of the third color at the current viewing angle becomes larger, decreasing the (1-3)th offset at the current viewing angle.

The method may include, as a luminance of the first color when a viewing angle is 0 degrees becomes larger, increasing the (1-1)th offset at the current viewing angle. The method may include, as a luminance of the second color when the viewing angle is 0 degrees becomes larger, increasing the (1-2)th offset at the current viewing angle. The method may include, as a luminance of the third color when the viewing angle is 0 degrees becomes larger, increasing the (1-3)th offset at the current viewing angle.

The method may include, as a luminance ratio of the first color in the entire luminance when the viewing angle is 0 degrees becomes larger, decreasing the (2-1)th offset at the current viewing angle. The method may include, as a luminance ratio of the second color in the entire luminance when the viewing angle is 0 degrees becomes larger, decreasing the (2-2)th offset at the current viewing angle. The method may include, as a luminance ratio of the third color in the entire luminance when the viewing angle is 0 degrees becomes larger, decreasing the (2-3)th offset at the current viewing angle.

The method may include, as a luminance ratio of the first color in the entire luminance at the current viewing angle becomes larger, increasing the (2-1)th offset at the current viewing angle. The method may include, as a luminance ratio of the second color in the entire luminance at the current viewing angle becomes larger, increasing the (2-2)th offset at the current viewing angle. The method may include, as a luminance ratio of the third color in the entire luminance at the current viewing angle becomes larger, increasing the (2-3)th offset at the current viewing angle.

The method may further include determining a final offset, based on the first offset and the second offset.

A plurality of representative viewing angles corresponding to a plurality of action groups may be predetermined. In the determining the current viewing angle, a representative viewing angle corresponding to an action group to which the current action belongs may be determined as the current viewing angle.

In the determining the final offset, a value obtained by multiplying the first offset and the second offset may be determined as the final offset.

In accordance with another aspect of the present disclosure, there is provided an electronic device including: an activity sensor including at least one sensor among a speed sensor, an acceleration sensor, a gyroscope, a gravity sensor, a heartbeat sensor, a geomagnetic sensor, a rotation vector sensor, a temperature sensor, a humidity sensor, an illuminance sensor, a direction sensor, a tilt sensor, and a camera module, wherein the activity sensor is configured to sense a current action of a user, using the at least one sensor; a processor configured to provide an input grayscale corresponding to an image; a display panel configured to display the image; a viewing angle corrector configured to determine a current viewing angle of the user with respect to the display panel, wherein the current viewing angle corresponds to the current action, correct the input grayscale based on the current viewing angle, and provide an output grayscale or an output voltage value based on correcting the input grayscale; and a data driver configured to generate a data voltage, using the output grayscale or the output voltage value, and provide the data voltage to the display panel, wherein the viewing angle corrector corrects the input grayscale, using a first offset for correcting a brightness change according to the current viewing angle and a second offset for correcting a color coordinate change according to the current viewing angle.

BRIEF DESCRIPTION OF THE DRAWINGS

Example embodiments will now be described more fully hereinafter with reference to the accompanying drawings; however, aspects supported by the present disclosure may be embodied in different forms and should not be construed as limited to the embodiments set forth herein. Rather, the example embodiments are provided such that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
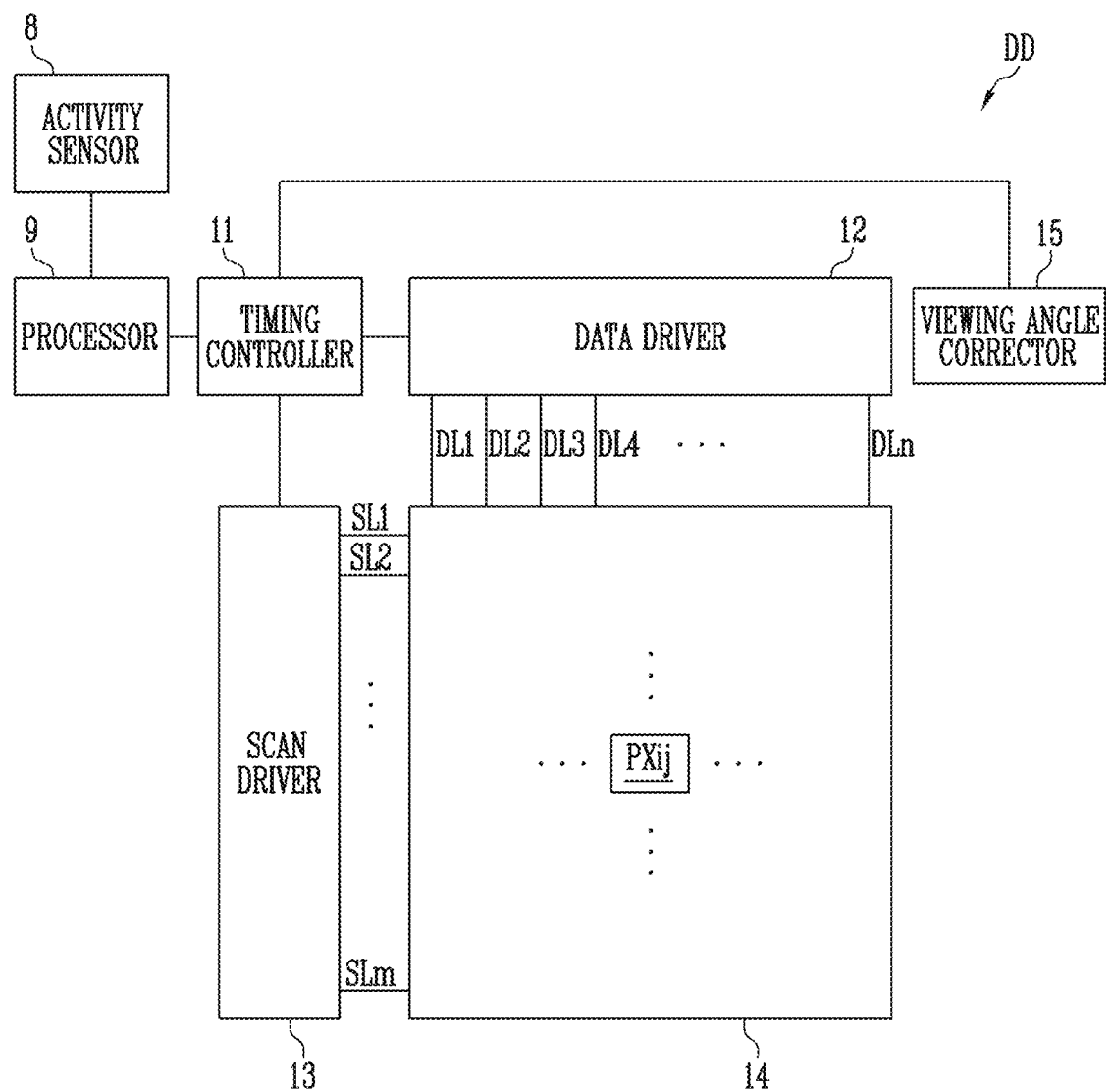
FIG. 1 is a diagram illustrating a display device in accordance with an embodiment of the present disclosure.

Hereinafter, example embodiments are described in detail with reference to the accompanying drawings such that those skilled in the art may easily practice the present disclosure. The present disclosure may be implemented in various different forms and is not limited to the example embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In some aspects, the size and thickness of each component illustrated in the drawings are arbitrarily illustrated for better understanding and ease of description, but embodiments of the present disclosure are not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "about" or "approximately" as used herein are inclusive of the stated value and include a suitable range of deviation for the particular value as determined by one of ordinary skill in the art, considering the measurement in question and the error associated with measurement of the particular quantity. The term "about" can mean within one or more standard deviations, or within ±30%, 20%, 10%, 5% of the stated value, for example.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a diagram illustrating a display device in accordance with an embodiment of the present disclosure.

Referring to FIG. 1, a display device DD in accordance with an embodiment of the present disclosure may include an activity sensor 8, a processor 9, a timing controller 11, a data driver 12, a scan driver 13, a display panel 14, and a viewing angle corrector 15 (also referred to herein as a viewing angle correction device or viewing angle correction circuitry).

The activity sensor 8 may sense a current action of a user. For example, the activity sensor 8 may include at least one of a speed sensor, an acceleration sensor, a gyroscope, a gravity sensor, a heartbeat sensor, a geomagnetic sensor, a rotation vector sensor, a temperature sensor, a humidity sensor, an illuminance sensor, a direction sensor, a tilt sensor, and a camera module. The activity sensor 8 may determine (or predict) a current action of the user by comparing a sensing value output from at least one sensor with a predefined reference values. For example, predefined actions may include "lying," "sitting," "walking," "getting in the car," and the like.

The processor 9 may provide an input grayscale of each image (or image frame) and control signals. The processor 9 may correspond to a Graphics Processing Unit (GPU), a Central Processing unit (CPU), an Application Processor (AP), or the like. The control signals may include a vertical synchronization signal, a horizontal synchronization signal, a data enable signal, and the like.

The vertical synchronization signal may include a plurality of pulses, and indicate that a previous frame period is ended and a current frame period is started with respect to a time at which each of the pulses is generated. An interval between adjacent pulses of the vertical synchronization signal may correspond to one frame period. The horizontal synchronization signal may include a plurality of pulses, and indicate that a previous horizontal period is ended and a new horizontal period is started with respect to a time at which each of the pulses is generated. An interval between adjacent pulses of the horizontal synchronization signal may correspond to one horizontal period. The data enable signal may have an enable level in specific horizontal periods and have a disable level with respect to the other period. In an example in which the data enable signal has the enable level, this indicates that color grayscales are supplied in the corresponding periods.

In some aspects, the processor 9 may provide the timing controller 11 or the viewing angle corrector 15 with the current action of the user, which is sensed by the activity sensor 8. In some embodiments, the activity sensor 8 may provide the sensed current action of the user directly to the timing controller 11 or the viewing angle corrector 15.

The viewing angle corrector 15 may determine a current viewing angle of the user with respect to the display panel 14, wherein the current viewing angle corresponds to the current action of the user, and correct an input grayscale of the display panel 14, based on the current viewing angle. The viewing angle corrector 15 may provide an output grayscale or an output voltage value by correcting the input grayscale.

The timing controller 11 may provide the viewing angle corrector 15 with a current action of the user and an input grayscale, and receive an output grayscale or an output voltage value from the viewing angle corrector 15. The timing controller 11 may provide the output grayscale or the output voltage value to the data driver 12. The timing controller 11 may provide the scan driver 13 with a clock signal, a scan start signal, and the like.

The data driver 12 may generate and provide data voltages to data lines DL1, DL2, DL3, DL4, . . . , and DLn, using the output grayscale or the output voltage value, which is received from the timing controller 11. Here, n may be an integer greater than 0.

The scan driver 13 may generate and provide scan signals to scan lines SL1, SL2, . . . , and SLm, using the clock signal, the scan start signal, and the like, which are received from the timing controller 11. Here, m may be an integer greater than 0.

The scan driver 13 may sequentially supply scan signals having a pulse of a turn-on level to the scan lines SL1, SL2, . . . , and SLm. For example, the scan driver 13 may supply scan signals having a turn-on level to the scan lines SL1, SL2, . . . , and SLm in a cycle corresponding to a cycle of the horizontal synchronization signal. The scan driver 13 may include scan stages configured in the form of shift registers. The scan driver 13 may generate scan signals in a manner that sequentially transfers the scan start signal in the form of a pulse of a turn-on level to a next scan stage under the control of the clock signal.

The display panel 14 may display an image. The display panel 14 may include pixels. Each of the pixels may be connected to a corresponding data line and a corresponding scan line. For example, a pixel PXij may be connected to an ith scan line and a jth data line. The pixels may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In some aspects, magenta, cyan, and yellow may be used as the first to third colors instead of red, green, and blue. However, in this embodiment, for convenience of description, it is described that the first color, the second color, and the third color are red, green, and blue.

In some embodiments, at least two of the activity sensor 8, the processor 9, the timing controller 11, the data driver 12, the scan driver 13, and the viewing angle corrector 15 may be provided as one integrated circuit. In some aspects, a relationship of communication of various data among the activity sensor 8, the processor 9, the timing controller 11, the data driver 12, the scan driver 13, and the viewing angle corrector 15 may be modified according to a type of the display device DD.

Figure 2:
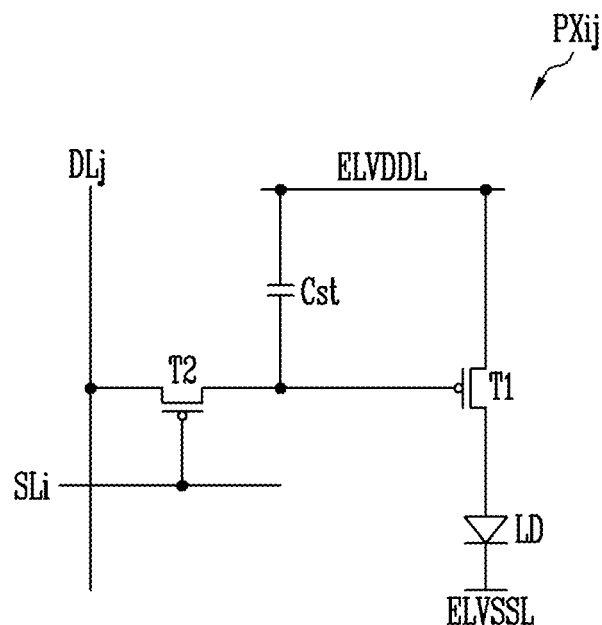
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, an example pixel PXij in accordance with one or more embodiments of the present disclosure is illustrated. The other pixels may also be configured substantially identically to the pixel PXij, and therefore, overlapping descriptions will be omitted.

A gate electrode of a transistor T1 may be connected to a second electrode of a storage capacitor Cst, a first electrode of the transistor T1 may be connected to a first power line ELVDDL, and a second electrode of the transistor T1 may be connected to an anode of a light emitting diode LD. The transistor T1 may be referred to as a driving transistor. A first power voltage may be applied to the first power line ELVDDL.

A gate electrode of a transistor T2 may be connected to an ith scan line SLi, a first electrode of the transistor T2 may be connected to a jth data line DLj, and a second electrode of the transistor T2 may be connected to the second electrode of the storage capacitor Cst.

A first electrode of the storage capacitor Cst may be connected to the first power line ELVDDL, and the second electrode of the storage capacitor Cst may be connected to the gate electrode of the transistor T1.

The anode of the light emitting diode LD may be connected to the second electrode of the transistor T1, and a cathode of the light emitting diode LD may be connected to a second power line ELVSSL. A second power voltage may be applied to the second power line ELVSSL. During an emission period of the light emitting diode LD, the first power voltage may be higher than the second power voltage.

Although the transistors T1 and T2 are illustrated as P-type transistors, those skilled in the art may replace at least one transistor with an N-type transistor by inverting the polarity of a signal.

When a scan signal having a turn-on level is applied to the ith scan line SLi, the transistor T2 may be turned on. A data voltage charged in the jth data line DLj may be stored in the storage capacitor Cst. The transistor T1 may allow a driving current to flow, corresponding to a gate-source voltage difference maintained by the storage capacitor Cst. The driving current may flow through a path of the first power line ELVDDL, the transistor T1, the light emitting diode LD, and the second power line ELVSS. The light emitting diode LD may emit light with a luminance corresponding to an amount of driving current.

Figure 3:
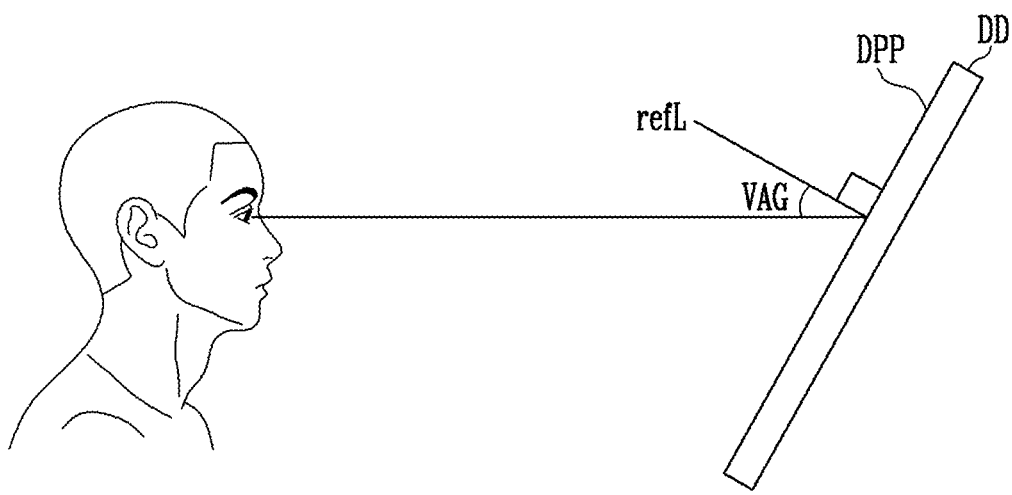
FIG. 3 is a diagram illustrating a viewing angle of a user with respect to a display panel.

FIG. 3 is a diagram illustrating a viewing angle of a user with respect to a display panel.

A reference line refL perpendicular to a display surface DPP of the display device DD in accordance with one or more embodiments of the present disclosure is illustrated. In an example in which eyes of the user accord with (or are parallel to) the reference line refL, a viewing angle VAG may be 0 degrees. As the user increasingly inclines the display device DD (and/or alternatively, as the user moves to a different position such that the display device DD is inclined with respect to the user), the viewing angle VAG may increase.

When the viewing angle VAG is changed, the brightness or color coordinate of an image viewed by the user may be changed. In order for the user to view an image having the same brightness or color coordinate as an original image, the display device DD in accordance with one or more embodiments of the present disclosure may correct an input grayscale according to the viewing angle VAG.

Figure 4:
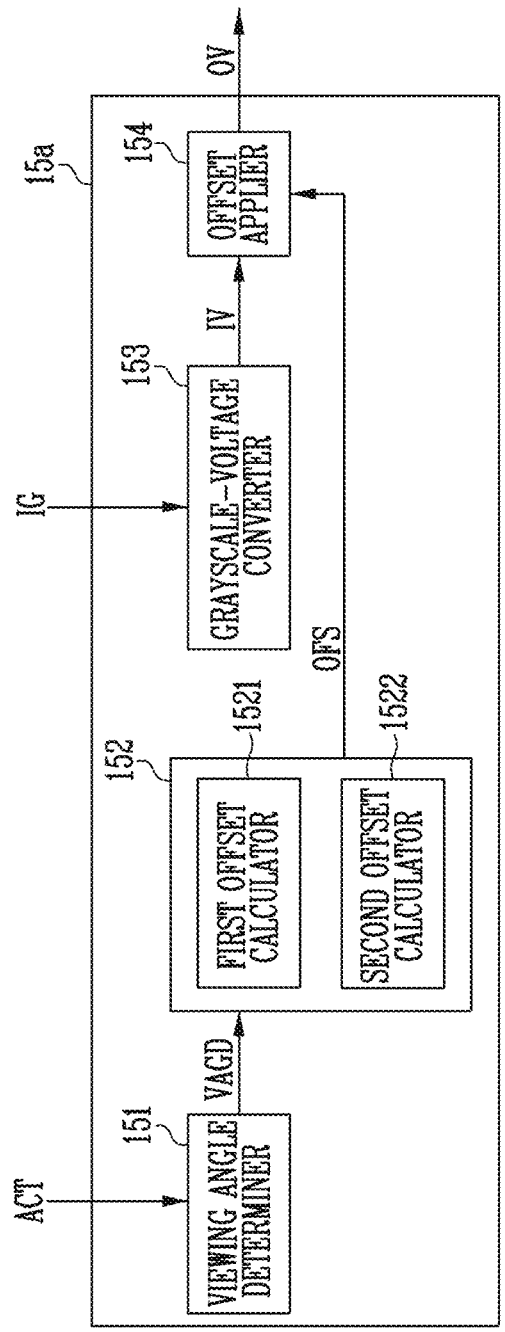
FIG. 4 is a diagram illustrating a viewing angle corrector in accordance with an embodiment of the present disclosure.
Figure 5:
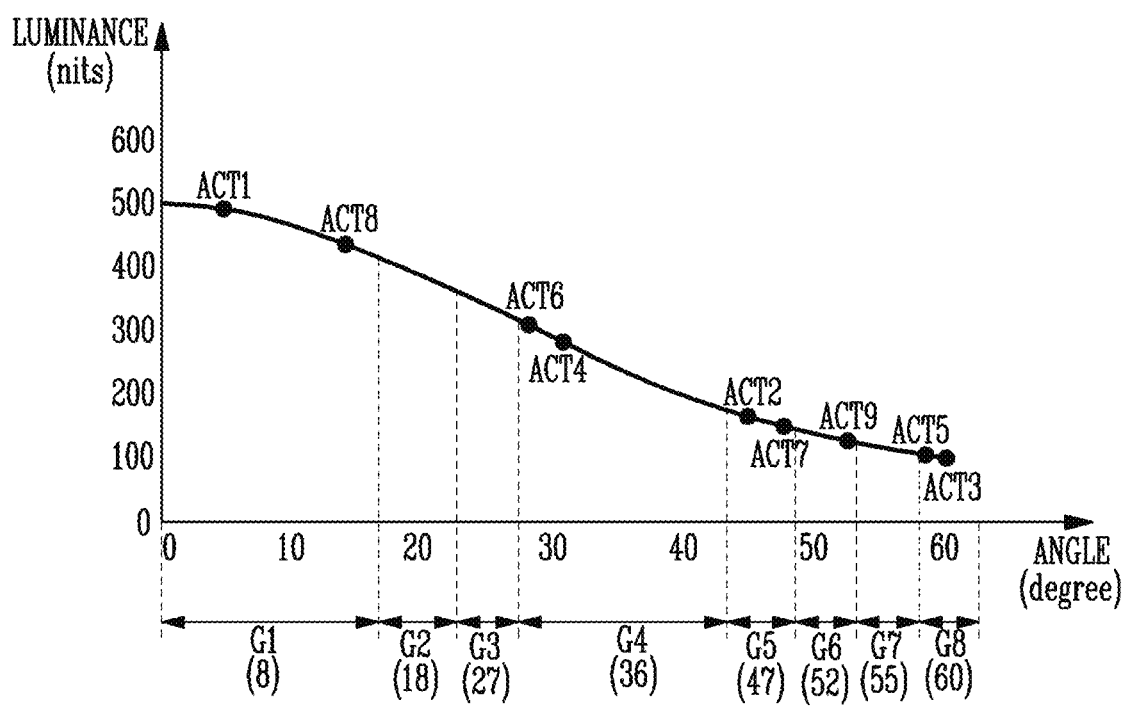
FIG. 5 is a diagram illustrating brightness difference according to viewing angle.
Figure 6:
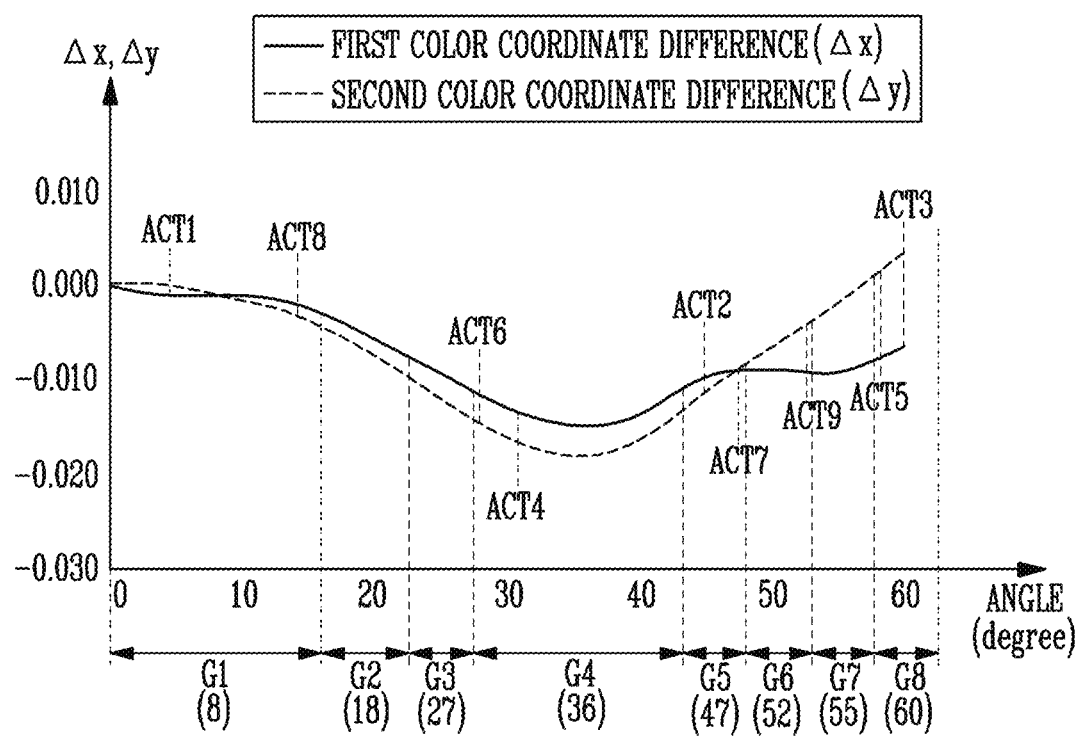
FIG. 6 is a diagram illustrating color coordinate difference according to viewing angle.
Figure 7:
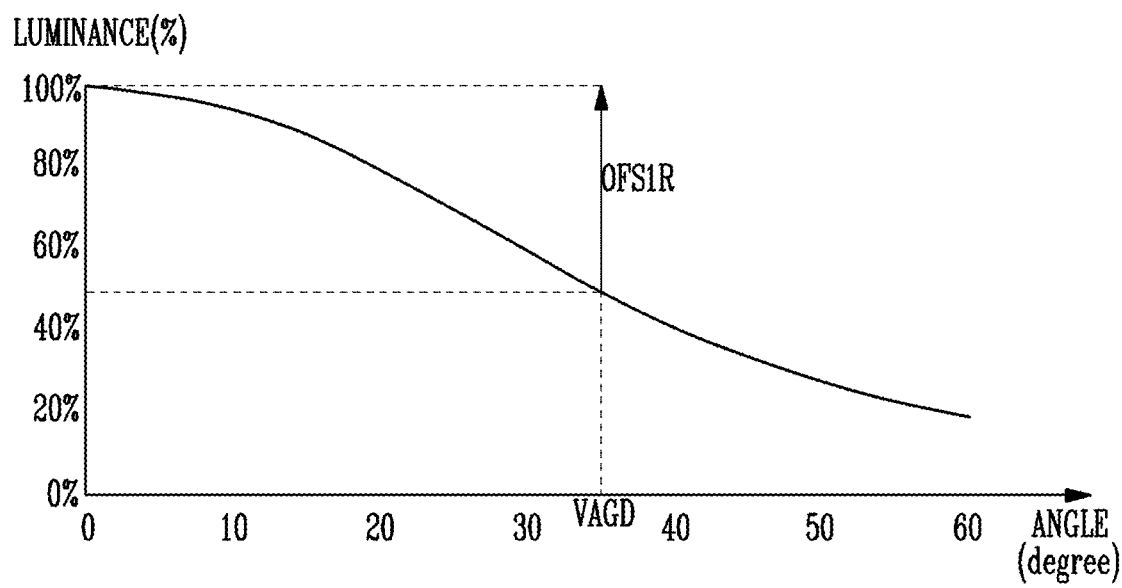
FIG. 7 is a diagram illustrating luminance of a first color according to viewing angle.
Figure 8:
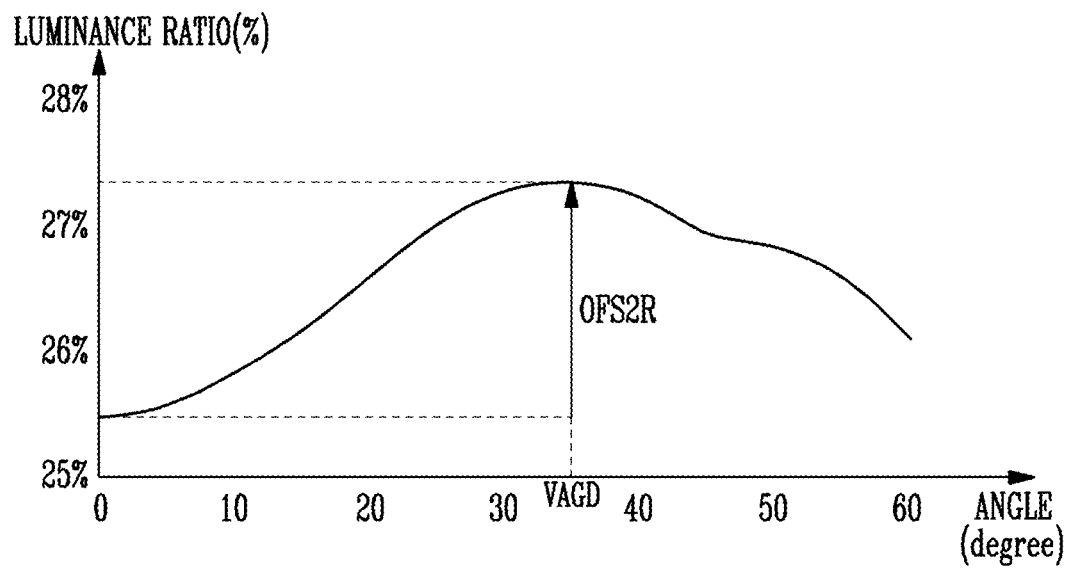
FIG. 8 is a diagram illustrating luminance ratio of the first color according to viewing angle.
Figure 9:
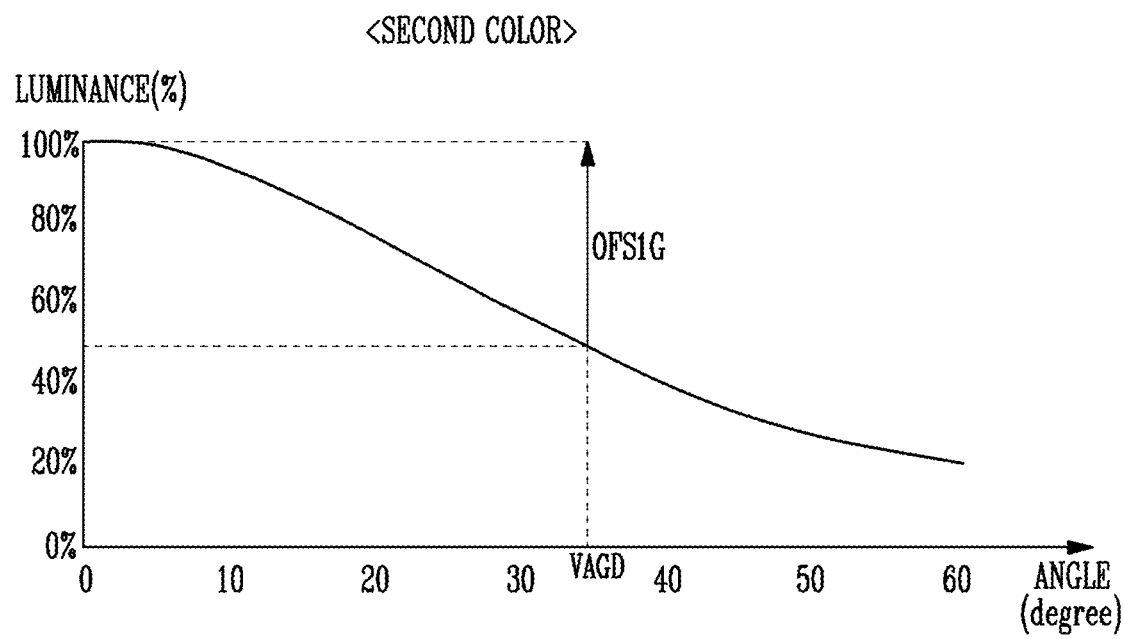
FIG. 9 is a diagram illustrating luminance of a second color according to viewing angle.
Figure 10:
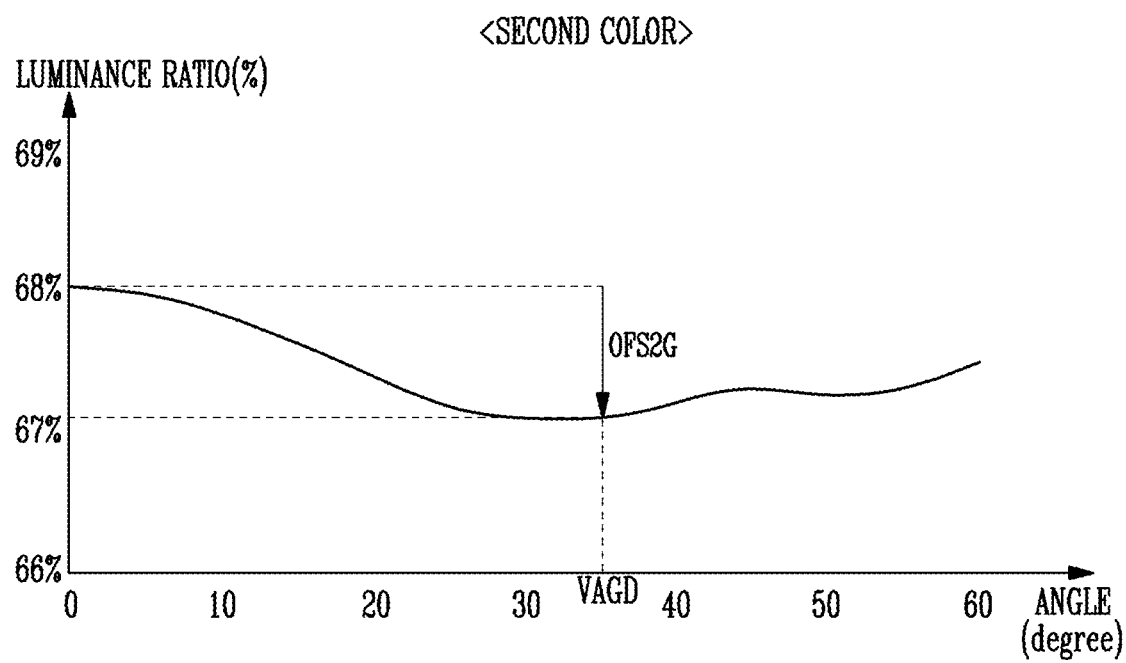
FIG. 10 is a diagram illustrating luminance ratio of the second color according to viewing angle.
Figure 11:
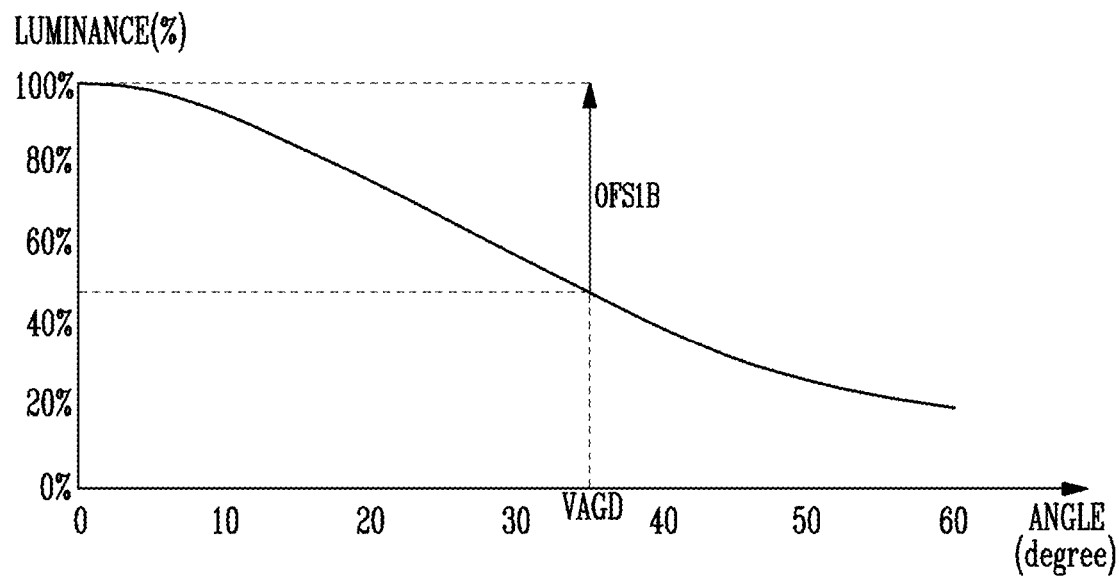
FIG. 11 is a diagram illustrating luminance of a third color according to viewing angle.
Figure 12:
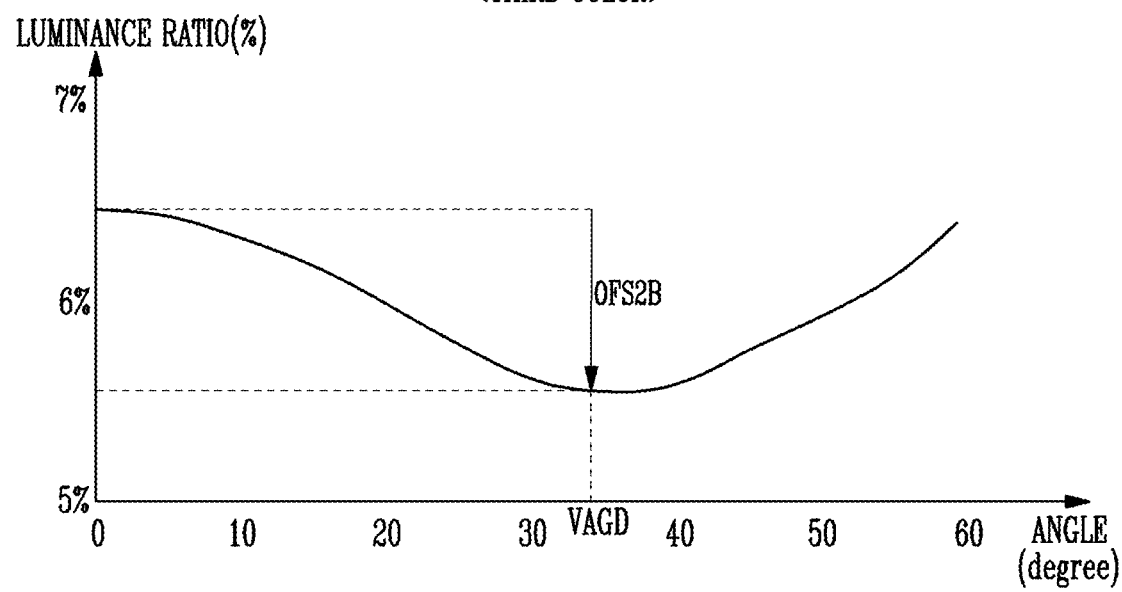
FIG. 12 is a diagram illustrating luminance ratio of the third color according to viewing angle.

FIG. 4 is a diagram illustrating a viewing angle corrector in accordance with an embodiment of the present disclosure. FIG. 5 is a diagram illustrating brightness difference according to viewing angle. FIG. 6 is a diagram illustrating color coordinate difference according to viewing angle. FIG. 7 is a diagram illustrating luminance of a first color according to viewing angle. FIG. 8 is a diagram illustrating luminance ratio of the first color according to viewing angle. FIG. 9 is a diagram illustrating luminance of a second color according to viewing angle. FIG. 10 is a diagram illustrating luminance ratio of the second color according to viewing angle. FIG. 11 is a diagram illustrating luminance of a third color according to viewing angle. FIG. 12 is a diagram illustrating luminance ratio of the third color according to viewing angle.

Referring to FIG. 4, a viewing angle corrector 15a in accordance with an embodiment of the present disclosure may include a viewing angle determiner 151, an offset determiner 152, a grayscale-voltage converter 153, and an offset applier 154.

The viewing angle corrector 15a may determine a current viewing angle VAGD of the user with respect to the display panel 14, wherein the current viewing angle VAGD corresponds to a current action ACT. For example, based on the current action ACT, the viewing angle corrector 15a may determine the current viewing angle VAGD of the user with respect to the display panel 14. The viewing angle corrector 15a may correct (e.g., adjust or modify) an input grayscale IG of the display panel 14, based on the current viewing angle VAGD. The viewing angle corrector 15a may correct the input grayscale IG, using a first offset for correcting a brightness change according to the current viewing angle VAGD and a second offset for correcting a color coordinate change according to the current viewing angle VAGD.

The viewing angle determiner 151 may determine the current viewing angle VAGD corresponding to the current action ACT. For example, a plurality of representative viewing angles corresponding to a plurality of action groups G1, G2, G3, G4, G5, G6, G7, and G8 may be predetermined. The viewing angle determiner 151 may determine, as the current viewing angle VAGD, a representative viewing angle corresponding to an action group to which the current action ACT belongs.

Referring to FIG. 5, an example of luminance viewed by the user according to viewing angle VAG is illustrated. Referring to FIG. 6, examples of color coordinate differences viewed by the user according to viewing angle VAG are illustrated. The color coordinate difference is based on a case where the viewing angle VAG is 0 degrees. That is, for example, no color coordinate difference may exist when the viewing angle VAG is 0 degrees. For example, color coordinate may follow the international standard of CIE1931. A first color coordinate difference may mean a delta x ($\Delta x$), and a second color coordinate difference may mean a delta y ($\Delta y$).

In the example described with reference to FIG. 5, viewing angles VAG with respect to example actions ACT1, ACT2, ACT3, ACT4, ACT5, ACT6, ACT7, ACT8, and ACT9 are 5, 45, 60, 30, 58, 27, 49, 14, and 55 degrees, respectively. For example, one action group may be defined to include actions in which the luminance difference is less than 100 nits, the first color coordinate difference is less than 0.007, and the second color coordinate difference is less than 0.007. For example, a first action group G1 may include a first action ACT1 and an eighth action ACT8. A fourth action group G4 may include a sixth action ACT6 and a fourth action ACT4. A fifth action group G5 may include a second action ACT2 and a seventh action ACT7. A sixth action group G6 may include a ninth action ACT9. An eighth action group G8 may include a fifth action ACT5 and a third action ACT3.

A representative viewing angle may be defined as an arithmetic mean of a viewing angle VAG of a mean luminance of actions belongs to each action group, a viewing angle VAG of a mean first color coordinate difference, and a viewing angle VAG of a mean second color coordinate difference. For example, a representative viewing angle of the first action group G1 may be defined as 8 degrees, a representative viewing angle of a second action group G2 may be defined as 18 degrees, a representative viewing angle of a third action group G3 may be defined as 27 degrees, a representative viewing angle of the fourth action group G4 may be defined as 36 degrees, a representative viewing angle of the fifth action group G5 may be defined as 47 degrees, a representative viewing angle of the sixth action group G6 may be defined as 52 degrees, a representative viewing angle of a seventh action group G7 may be defined as 55 degrees, and a representative viewing angle of the eighth action group G8 may be defined as 60 degrees.

In another embodiment, the viewing angle determiner 151 may determine, as the current viewing angle VAGD, a viewing angle VAG with respect to each of the actions ACT1 to ACT9. For example, a current viewing angle VAGD with respect to the first action ACT may be determined as 5 degrees. As such, the viewing angle determiner 151 may determine the current viewing angle VAGD with the current action ACT, using various methods.

In accordance with this embodiment, although the display device DD does not include any eye tracking sensor, the display device DD can determine a viewing angle VAGD with respect to the display panel 14, such that cost can reduced.

The offset determiner 152 may include a first offset calculator 1521 and a second offset calculator 1522. The offset determiner 152 may calculate a first offset and a second offset, based on the current viewing angle VAGD, and determine a final offset OFS, based on the first offset and the second offset. As described herein, the first offset is used to correct a brightness change according to the current viewing angle VAGD, and the second offset may be used to correct a color coordinate difference according to the current viewing angle VAGD.

The first offset may include a (1-1)th offset OFS1R with respect to a first color, a (1-2)th offset OFS1G with respect to a second color, and a (1-3)th offset OFS1B with respect to a third color.

Referring to FIG. 7, an example of luminance of the first color with respect to viewing angle VAG is illustrated. The graph is based on a case where the viewing angle VAG is 0 degrees. That is, a luminance when the viewing angle VAG is 0 degrees is defined as 100%. In an example in which the current viewing angle VAGD is 35 degrees, the luminance of the first color may be about 50%. The (1-1)th offset OFS1R may be an offset for compensating for such a luminance difference.

Similarly, referring to FIG. 9, the (1-2)th offset OFS1G for compensating for a luminance of the second color with respect to the viewing angle VAG is conceptually illustrated. Referring to FIG. 11, the (1-3)th offset OFS1B for compensating for a luminance of the third color with respect to the viewing angle VAG is conceptually illustrated. For example, the first offset calculator 1521 may calculate each of the (1-1)th offset OFS1R, the (1-2)th offset OFS1G, and the (1-3)th offset OFS1B through the following Equation 1.

$$OFS1 = Lum(0)/Lum(VAGD) \quad \text{Equation 1}$$

OFS1 may be the first offset (the (1-1)th offset OFS1R, the (1-2)th offset OFS1G, or the (1-3)th offset OFS1B), Lum (0) may be a luminance (a luminance of the first color, the second color, or the third color) when the viewing angle VAG is 0 degrees, and Lum (VAGD) may be a luminance (a luminance of the first color, the second color, or the third color) at the current viewing angle VAGD.

As the luminance of the first color at the current viewing angle VAGD becomes larger, the (1-1)th offset OFS1R at the current viewing angle VAGD may be set smaller (e.g., the display device DD may decrease the (1-1)th offset OFS1R at the current viewing angle VAGD). Similarly, as the luminance of the second color at the current viewing angle VAGD becomes larger, the (1-2)th offset OFS1G at the current viewing angle VAGD may be set smaller (e.g., the display device DD may decrease the (1-2)th offset OFS1G at the current viewing angle VAGD). As the luminance of the third color at the current viewing angle VAGD becomes larger, the (1-3)th offset OFS1B at the current viewing angle VAGD may be set smaller (e.g., the display device DD may decrease the (1-3)th offset OFS1B at the current viewing angle VAGD).

In some aspects, as the luminance of the first color when the viewing angle VAG is 0 degrees becomes larger, the (1-1)th offset OFS1R at the current viewing angle VAGD may be set larger (e.g., the display device DD may increase the (1-1)th offset OFS1R at the current viewing angle VAGD). Similarly, as the luminance of the second color when the viewing angle VAG is 0 degrees becomes larger, the (1-2)th offset OFS1G at the current viewing angle VAGD may be set larger (e.g., the display device DD may increase the (1-2)th offset OFS1G at the current viewing angle VAGD). As the luminance of the third color when the viewing angle VAG is 0 degrees becomes larger, the (1-3)th offset OFS1B at the current viewing angle VAGD may be set larger (e.g., the display device DD may increase the (1-3)th offset OFS1B at the current viewing angle VAGD).

The second offset may include a (2-1)th offset OFS2R with respect to the first color, a (2-2)th offset OFS2G with respect to the second color, and a (2-3)th offset OFS2B with respect to the third color.

Referring to FIG. 8, an example of a luminance ratio of the first color with respect to viewing angle VAG is illustrated. The luminance ratio of the first color may mean a luminance ratio of the first color with respect to the entire luminance (i.e., 100%). For example, a sum obtained by adding up a luminance ratio of the first color, a luminance ratio of the second color, and a luminance ratio of the third color at each viewing angle VAG may be 100%. In an example in which the current viewing angle VAGD is 35 degrees, the luminance ratio of the first color may be about 27.3%. The (2-1)th offset OFS2R may be an offset for compensating for a difference between a luminance ratio of the first color when the viewing angle VAG is 0 degrees and a luminance ration of the first color at the current viewing angle VAGD.

Similarly, referring to FIG. 10, the (2-2)th offset OFS2G for compensating for a luminance ratio of the second color with respect to viewing angle VAG is conceptually illustrated. Referring to FIG. 12, the (2-3)th offset OFS2B for compensating for a luminance ratio of the third color with respect to viewing angle VAG is conceptually illustrated.

For example, the second offset calculator 1552 may calculate each of the (2-1)th offset OFS2R, the (2-2)th offset OFS2G, and the (2-3)th offset OFS2B through the following Equation 2.

$$OFS2 = LumR(VAGD)/LumR(0) \quad \text{Equation 2}$$

OFS2 may be the second offset (the (2-1)th offset OFS2R, the (2-2)th offset OFS2G, or the (2-3)th offset OFS2B), LumR(VAGD) may be a luminance ratio (a luminance ratio of the first color, the second color, or the third color) at the current viewing angle VAGD, and LumR(0) may be a luminance ratio (a luminance ratio of the first color, the second color, or the third color) when the viewing angle VAG is 0 degrees.

As the luminance ratio of the first color in the entire luminance when the viewing angle VAG is 0 degrees becomes larger, the (2-1)th offset OFS2R at the current viewing angle VAGD may be set smaller (e.g., the display device DD may decrease the (2-1)th offset OFS2R at the current viewing angle VAGD). Similarly, as the luminance ratio of the second color in the entire luminance when the viewing angle VAG is 0 degrees becomes larger, the (2-2)th offset OFS2G at the current viewing angle VAGD may be set smaller (e.g., the display device DD may decrease the (2-2)th offset OFS2G at the current viewing angle VAGD). As the luminance ratio of the third color in the entire luminance when the viewing angle VAG is 0 degrees becomes larger, the (2-3)th offset OFS2B at the current viewing angle VAGD may be set smaller (e.g., the display device DD may decrease the (2-3)th offset OFS2B at the current viewing angle VAGD).

In some aspects, as the luminance ratio of the first color in the entire luminance at the current viewing angle VAGD becomes larger, the (2-1)th offset OFS2R at the current viewing angle VAGD may be set larger (e.g., the display device DD may increase the (2-1)th offset OFS2R at the current viewing angle VAGD). Similarly, as the luminance ratio of the second color in the entire luminance at the current viewing angle VAGD becomes larger, the (2-2)th offset OFS2G at the current viewing angle VAGD may be set larger (e.g., the display device DD may increase the (2-2)th offset OFS2G at the current viewing angle VAGD). As the luminance ratio of the third color in the entire luminance at the current viewing angle VAGD becomes larger, the (2-3)th offset OFS2B at the current viewing angle VAGD may be set larger (e.g., the display device DD may increase the (2-3)th offset OFS2B at the current viewing angle VAGD).

The offset determiner 152 may determine, as the final offset OFS, a value obtained by multiplying the first offset and the second offset. For example, the offset determiner 152 may determine, as a first final offset with respect to the first color, a value obtained by the (1-1)th offset OFS1R and the (2-1)th offset OFS2R. Similarly, the offset determiner 152 may determine, as a second final offset with respect to the second color, a value obtained by the (1-2)th offset OFS1G and the (2-2)th offset OFS2G. The offset determiner 152 may determine, as a third final offset with respect to the third color, a value obtained by the (1-3)th offset OFS1B and the (2-3)th offset OFS2B.

The grayscale-voltage converter 153 may convert the input grayscale IG into a corresponding input voltage value IV. For example, a gamma value (e.g., 2.2 gamma, 2.4 gamma, or the like) may be set basically or according to preference of the user in the display device DD. The grayscale-voltage converter 153 may convert the input grayscale IG into the input voltage value IV corresponding to the set gamma value.

The offset applier 154 may generate an output voltage value OV by applying the final offset OFS to the input voltage value IV. For example, the offset applier 154 may generate the output voltage value OV by multiplying the input voltage value IV by the final offset OFS. For example, the offset applier 154 may generate an output voltage OV with respect to the first color by multiplying an input voltage value with respect to the first color by the first final offset. Similarly, the offset applier 154 may generate an output voltage OV with respect to the second color by multiplying an input voltage value with respect to the second color by the second final offset. The offset applier 154 may generate an output voltage OV with respect to the third color by multiplying an input voltage value with respect to the third color by the third final offset.

In accordance with this embodiment, although the viewing angle VAG of the user with respect to the display device DD varies, the brightness and color coordinate, which are viewed by the user, may be, and be equally maintained.

Figure 13:
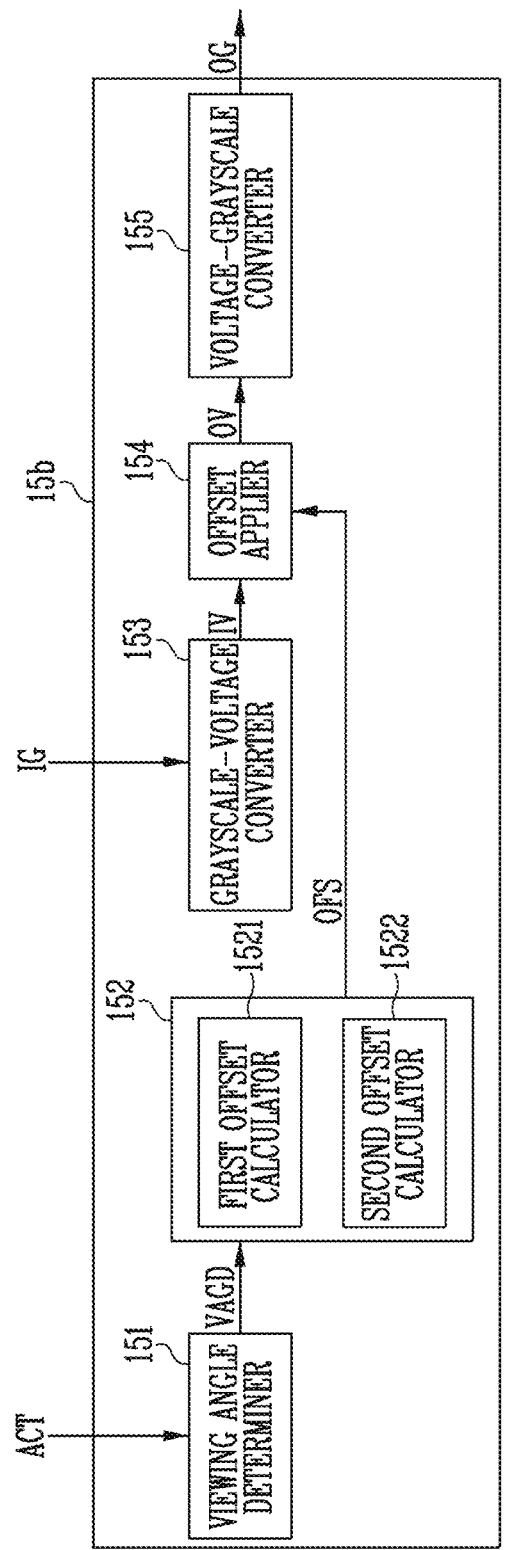
FIG. 13 is a diagram illustrating a viewing angle corrector in accordance with another embodiment of the present disclosure.

FIG. 13 is a diagram illustrating a viewing angle corrector in accordance with another embodiment of the present disclosure.

Referring to FIG. 13, a viewing angle corrector 15b may further include a voltage-grayscale converter 155 with respect to the viewing angle corrector 15a illustrated in FIG. 4. The other components of the viewing angle corrector 15b are identical to the components of the viewing angle corrector 15a, and therefore, overlapping descriptions will be omitted.

The voltage-grayscale converter 155 may convert the output voltage value OV into an output grayscale OG. That is, the voltage-grayscale converter 155 may perform gamma reverse conversion. Aspects of the present disclosure may include implementing this embodiment for cases in which a grayscale-dimensional value instead of a voltage-dimensional value is to be used when the timing controller 11 or the data driver 12 calculates data.

Figure 14:
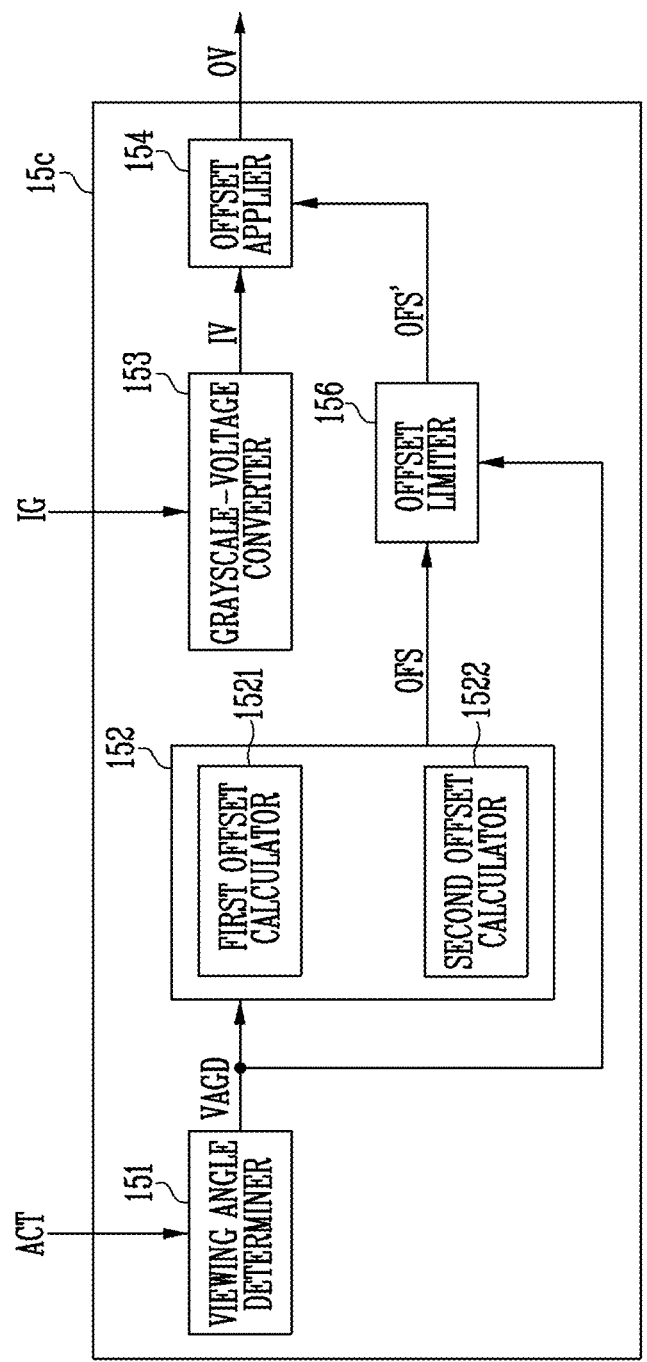
FIG. 14 is a diagram illustrating a viewing angle corrector in accordance with still another embodiment of the present disclosure.

FIG. 14 is a diagram illustrating a viewing angle corrector in accordance with still another embodiment of the present disclosure.

Referring to FIG. 14, a viewing angle corrector 15c may further include an offset limiter 156 with respect to the viewing angle corrector 15a illustrated in FIG. 4. The other components of the viewing angle corrector 15c are identical to the components of the viewing angle corrector 15a, and therefore, overlapping descriptions will be omitted.

The offset limiter 156 may limit the final offset OFS, based on the current viewing angle VAGD, thereby generating a corrected offset OFS'. The offset applier 154 may use the corrected offset OFS' instead of the final offset OFS. The corrected offset OFS' may be smaller than or equal to the final offset OFS. For example, the offset limiter 156 may set or adjust a maximum luminance according to which the display device DD may output an image. In accordance with this embodiment, the luminance of a corrected image may be controlled by the offset limiter 156 not to exceed the maximum luminance of the display device DD, which may prevent abnormal display and reduce power consumption.

Figure 15:
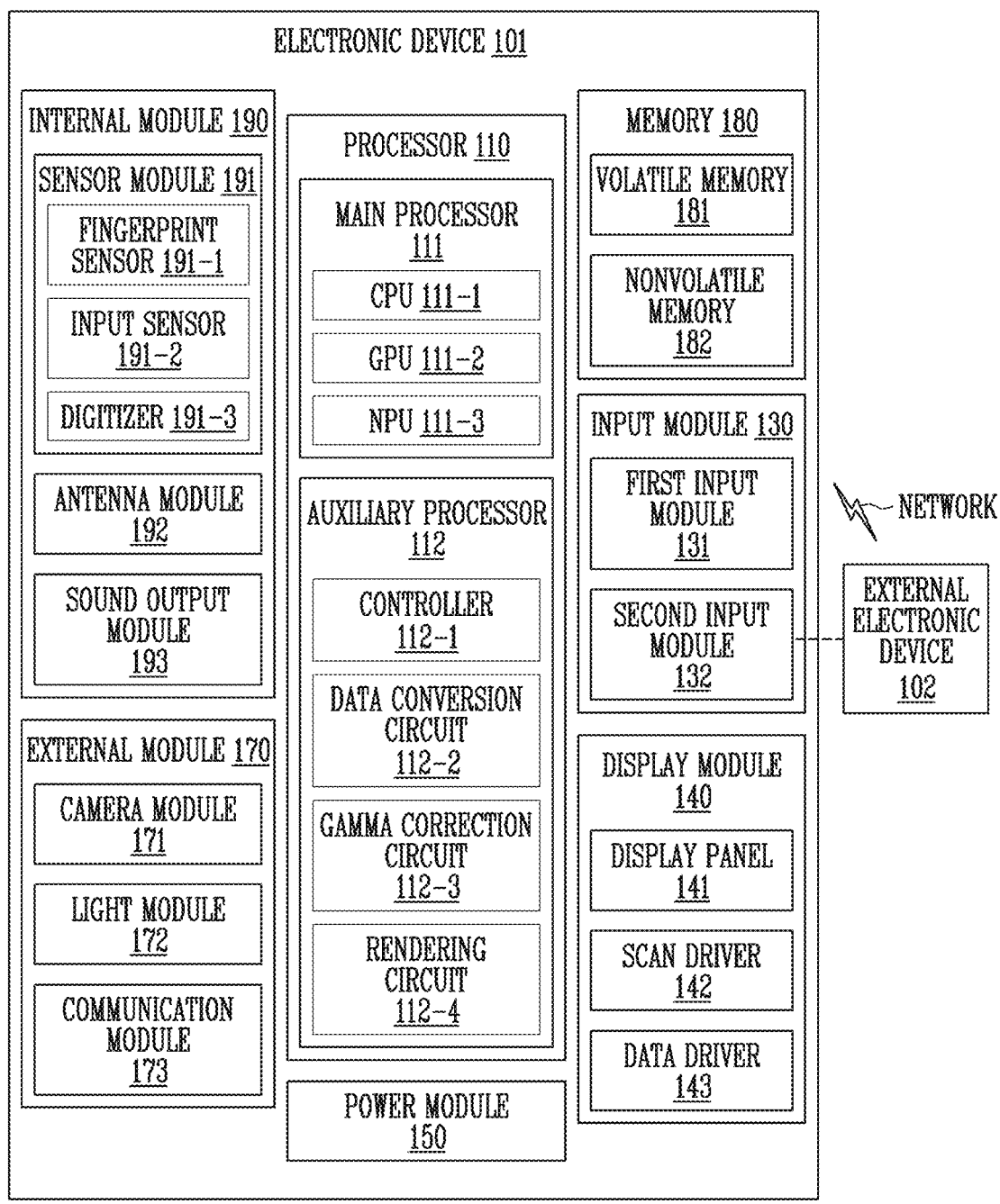
FIG. 15 is a block diagram illustrating an electronic device in accordance with embodiments of the present disclosure.

FIG. 15 is a block diagram illustrating an electronic device in accordance with embodiments of the present disclosure.

An electronic device 101 may output various information through a display module 140. In an example in which a processor 110 executes an application stored in a memory 180, the display module 140 may provide application information to a user through a display panel 141. Aspects of the techniques and methods described herein as performable by the electronic device 101 may be implemented based on the processor 110 executing instructions stored on the memory 180 of the electronic device 101.

The processor 110 may acquire an external input through an input module 130 or a sensor module 191, and execute an application corresponding to the external input. In an example in which the user selects a camera icon displayed on the display panel 141, the processor 110 may acquire a user input through an input sensor 191-2, and activate a camera module 171. The processor 110 may transfer, to the display module 140, image data corresponding to a photographed image acquired through the camera module 171. The display module 140 may display an image corresponding to the photographed image through the display panel 141.

In another example, when personal information authentication is executed in the display module 140, a fingerprint sensor 191-1 may acquire input fingerprint information as input data. The processor 110 may compare the input data acquired through the fingerprint sensor 191-1 with authentication data stored in the memory 180, and execute an application according to a comparison result. The display module 140 may display information executed according to a logic of the application through the display panel 141.

In still another example, when a music streaming icon displayed on the display module 140 is selected, the processor 110 may acquire a user input through the input sensor 191-2, and active a music streaming application stored in the memory 180. In an example in which a music play command is input in the music streaming application, the processor 110 may activate a sound output module 193, thereby providing the user with sound information which accords with the music play command.

In the above, operations of the electronic device 101 have been briefly described. Hereinafter, components of the electronic device 101 will be described in detail. Some of the components of the electronic device 101, which will be described later, may be integrated and provided as a single component, and instances of a single component may be separated and provided as two or more components.

Referring to FIG. 15, the electronic device 101 may communicate with an external electronic device 102 through a network (e.g., a short-range wireless communication network or a long-range wireless communication network). In accordance with an embodiment, the electronic device 101 may include the processor 110, the memory 180, the input module 130, the display module 140, a power module 150, an internal module 190, and an external module 170. In accordance with an embodiment, in the electronic device 101, at least one of the described components may be omitted, or one or more other components may be added. In accordance with an embodiment, some components (e.g., the sensor module 191, an antenna module 192, and/or the sound output module 193) among the described components may be integrated in another component (e.g., the display module 140).

The processor 110 may control at least another component (e.g., a hardware or software component) of the electronic device 101, which is connected to the processor 110, by executing software, and perform various processing or calculations. In accordance with an embodiment, as at least a portion of the data processing and calculations, the processor 110 may store, in a volatile memory 181, a command or data, received from another component (e.g., the input module 130, the sensor module 191, or a communication module 173), process the command or data, stored in the volatile memory 181, and store result data in a nonvolatile memory 182.

The processor 110 may include a main processor 111 and an auxiliary processor 112. The main processor 111 may include at least one of a central processing unit (CPU) 111-1 or an application processor (AP). The main processor 111 may further include at least one of a graphic processing unit (GPU) 111-2, a communication processor (CP), and an image signal processor (ISP). The main processor 111 may further include a neural processing unit (NPU) 111-3. The NPU 111-3 is a processor specified for processing an artificial intelligence (AI) model, and the AI model may be generated through machine learning. The AI model may include a plurality of artificial neural network layers. An artificial neural network may be a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks, or one of two or more combinations thereof, but the present disclosure is not limited to the described example. The AI model may additionally or alternatively include a software structure, in addition to a hardware structure. At least two of the processing units described herein and the processors described herein may be implemented into one integrated component (e.g., a single chip), or be implemented as components (e.g., a plurality of chips) independent from each other.

The auxiliary processor 112 may include a controller 112-1. The controller 112-1 may include an interface conversion circuit and a timing control circuit. The controller 112-1 may receive an image signal from the main processor 111. The controller 112-1 may convert a data format of the image signal such that the image signal is suitable for interface specifications with the display module 140, thereby outputting image data. The controller 112-1 may output various control signals supportive of driving of the display module 140.

The auxiliary processor 112 may further include a data conversion circuit 112-2, a gamma correction circuit 112-3, a rendering circuit 112-4, and the like. The data conversion circuit 112-2 may receive image data from the controller 112-1, and compensate for the image data such that an image is displayed with a desired luminance according to a characteristic of the electronic device 101 or a setting of the user or convert the image data for the purpose of reduction of power consumption, afterimage compensation, or the like. The gamma correction circuit 112-3 may convert image data, a gamma reference voltage, or the like such that an image displayed in the electronic device 101 has a desired gamma characteristic. The rendering circuit 112-4 may receive image data from the controller 112-1, and render the image data by considering a pixel arrangement of the display panel 141, and the like, applied to the electronic device 101. At least one of the data conversion circuit 112-2, the gamma correction circuit 112-3, and the rendering circuit 112-4 may be integrated in another component (e.g., the main processor 111 or the controller 112-1). At least one of the data conversion circuit 112-2, the gamma correction circuit 112-3, and the rendering circuit 112-4 may be integrated into a data driver 143 which will be described later.

The memory 180 may store various data used by at least one component (e.g., the processor 110 or the sensor module 191) of the electronic device 101 and input or output data about a command associated therewith. The memory 180 may include at least one of the volatile memory 181 and the nonvolatile memory 182.

The input module 130 may receive a command or data to be used in a component (e.g., the processor 110, the sensor module 191, or the sound output module 193) of the electronic device 101 from the outside (e.g., the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (e.g., a button), or a pen (e.g., a passive pen or an active pen). The second input module 132 may support a specified protocol capable of connecting the electronic device 101 to the external electronic device 102 by wired or wireless. In accordance with an embodiment, the second input module 132 may include a high definition multimedia interface (HDMI), a universal serial bus (USB) interface, an SD card interface, or an audio interface. The second input module 132 may include a connector, e.g., an HDMI connector, a USB connector, an SD card connector, or an audio connector (e.g., a headphone connector), which can physically connect the electronic device 101 to the external electronic device 2000.

The display module 140 may visually provide information to the user. The display module 140 may include the display panel 141, a scan driver 142, and the data driver 1143. The display module 140 may further include a window for protecting the display panel 141, a chassis, and a bracket.

The display panel 141 may include a liquid crystal display panel, an organic light emitting display panel, or an inorganic light emitting display panel, and the type of the display panel 141 is not particularly limited. The display panel 141 may be of a rigid type or a flexible type in which the display panel 141 is rollable or foldable. The display module 140 may further include a supporter for supporting the display panel 141, a bracket, a heat dissipation member, or the like.

The scan driver 142 is a driving chip, and may be mounted in the display panel 141. In some aspects, the scan driver 142 may be integrated in the display panel 141. For example, the scan driver 142 may include an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit, which is embedded in the display panel 141. The scan driver 142 may receive a control signal from the controller 112-1, and output scan signals to the display panel 141 in response to the control signal.

The display panel 141 may further include an emission driver. The emission driver may output an emission control signal to the display panel 141 in response to a control signal received from the controller 112-1. The emission driver may be formed separately from the scan driver 142, or be integrated in the scan driver 142.

The data driver 143 may receive a control signal from the controller 112-1, and convert image data into an analog voltage (e.g., a data voltage) and then output data voltages to the display panel 141 in response to the control signal.

The data driver 143 may be integrated in another component (e.g., the controller 112-1). Functions of the interface conversion circuit and the timing control circuit of the controller 112-1, which are described herein, may be integrated in the data driver 143.

The display module 140 may further include an emission driver and a voltage generating circuit. The voltage generating circuit may output various voltages supportive of driving the display panel 141.

The power module 150 may supply power to at least one component of the electronic device 101. The power module 150 may include a battery for charging a power voltage. The battery may include a primary cell which is not rechargeable, a secondary cell which is rechargeable, or a fuel cell. The power module 150 may include a power management integrated circuit (PMIC). The PMIC may supply an optimized power source to each of the described modules and modules which will be described later. The power module 150 may include a wireless power transmission/reception member electrically connected to the battery. The wireless power transmission/reception member may include a plurality of coil-shaped antenna radiators.

The electronic device 101 may further include the internal module 190 and the external module 170. The internal module 190 may include the sensor module 191, the antenna module 192, and the sound output module 193. The external module 170 may include the camera module 171, a light module 172, and the communication module 173.

The sensor module 191 may sense an input caused by a body of the user or an input caused by a pen in the first input module 131, and generate an electrical signal or a data value, which corresponds to the input. The sensor module 191 may include at least one of the fingerprint sensor 191-1, the input sensor 191-2, and a digitizer 191-3.

The fingerprint sensor 191-1 may generate a data value corresponding to a fingerprint of the user. The fingerprint sensor 191-1 may include any one of an optical type fingerprint sensor and a capacitive type fingerprint sensor.

The input sensor 191-2 may generate a data value corresponding to coordinate information of the input caused by the body of the user or the input caused by the pen. The input sensor 191-2 may generate, as a data value, a capacitance variation caused by the input. The input sensor 191-2 may sense an input caused by a passive pen, or transmit/receive data to/from an active pen.

The input sensor 191-2 may measure a biometric signal such as, for example, pressure, moisture or body fat. In an example in which the user does not move for a constant time while a body part of the user is in contact with a sensor layer or a sensing panel, the input sensor 191-2 may output information which the user wants to the display module 140 by sensing a biometric signal, based on a change in electric field, caused by the body part.

The digitizer 191-3 may generate a data value corresponding to the coordinate information of the input caused by the pen. The digitizer 191-3 may generate, as a data value, an electromagnetic variation caused by the input. The digitizer 191-3 may sense an input caused by the passive pend, or transmit/receive data to/from the active pen.

At least one of the fingerprint sensor 191-1, the input sensor 191-2, and the digitizer 193-3 may be implemented as a sensor layer formed on the display panel 141 through a continuous process. At least one of the fingerprint sensor 191-1, the input sensor 191-2, and the digitizer 191-3 may be disposed at an upper side of the display panel 141, and any one, e.g., the digitizer 191-3 among the fingerprint sensor 191-1, the input sensor 191-2, and the digitizer 191-3, may be disposed at a lower side of the display panel 141.

At least two of the fingerprint sensor 191-1, the input sensor 191-2, and the digitizer 191-3 may be formed and integrated into one sensing panel through the same process. In an example in which at least two of the fingerprint sensor 191-1, the input sensor 191-2, and the digitizer 191-3 are integrated into one sensing panel, the sensing panel may be disposed between the display panel 141 and the window disposed at an upper side of the display panel 141. In accordance with an embodiment, the sensing panel may be disposed on the window, and the position of the sensing panel is not particularly limited.

At least one of fingerprint sensor 191-1, the input sensor 191-2, and the digitizer 191-3 may be built in the display panel 141. That is, at least one of fingerprint sensor 191-1, the input sensor 191-2, and the digitizer 191-3 may be simultaneously formed through a process of forming elements (e.g., a light emitting element, a transistor, and the like) included in the display panel 141.

Besides, the sensor module 191 may generate an electrical signal or a data value, which corresponds to an internal state or an external state of the electronic device 101. The sensor module 191 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 192 may include one or more antennas for transmitting a signal or power to the outside or receiving a signal or power from the outside. In accordance with an embodiment, the communication module 173 may transmit a signal to the external electronic device or receive a signal from the external electronic device through an antenna suitable for a communication scheme. An antenna pattern of the antenna module 192 may be integrated in one component (e.g., the display panel 141) of the display module 140, the input sensor 191-2, or the like.

The sound output module 193 is a device for outputting a sound signal to the outside of the electronic device 101, and include, for example, a speaker used for a general purpose such as, for example, multimedia playback or transcription playback and a receiver used for call reception (and in some cases, only for call reception). In accordance with an embodiment, the receiver may be integrally formed with the speaker or be formed separately from the speaker. A sound output pattern of the sound output module 193 may be integrated in the display module 140.

The camera module 171 may photograph a still image and moving images. In accordance with an embodiment, the camera module 171 may include one or more lenses, an image sensor, or an image signal processor. The camera module 171 may further include an infrared camera capable of measuring existence of the user, a position of the user, eyes of the user, or the like.

The light module 172 may provide light. The light module 172 may include a light emitting diode or a xenon lamp. The light module 172 may operate in linkage with the camera module 171 or operate independently from the camera module 171.

The communication module 173 may establish a wired or wireless communication channel between the electronic device 101 and the external electronic device 102, and support communication performance through the established communication channel. The communication module may include any one or all of a wireless communication module such as, for example, a cellular communication module, a short-range wireless communication module, or a global navigation satellite system (GNSS) communication module, and a wired communication module such as, for example, a local area network (LAN) communication module or a power line communication (PLC) module. The communication module 173 may communicate with the external electronic device 102 through a short-range communication network such as, for example, Bluetooth™, wireless-fidelity (WiFi) direct, or infrared data association (IrDA), or a long-range communication network such as, for example, a cellular network, Internet, or a computer network (e.g., LAN or wide area network (WAN)). The several types of communication modules described herein may be implemented into one chip or be respectively implemented as separate chips.

The input module 130, the sensor module 191, the camera module 171, and the like may be used to control an operation of the display module 140 in linkage with the processor 110.

The processor 110 may output a command or data to the display module 140, the sound output module 193, the camera module 171, or the light module 172, based on input data received from the input module 130. For example, the processor 110 may generate image data, corresponding to input data applied through a mouse, an active pen, or the like, and output the image data to the display module 140. Alternatively, the processor 110 may generate command data, corresponding to the input data, and output the command data to the camera module 171 or the light module 172. In an example in which no input data is received from the input module 130, the processor 110 may change the operation mode of the electronic device 101 to a low power mode or a sleep mode, thereby reducing power consumed in the electronic device 101.

The processor 110 may output a command or data to the display module 140, the sound output module 193, the camera module 171, or the light module 172, based on sensing data received from the sensor module 191. For example, the processor 110 may compare authentication data applied by the fingerprint sensor 191-1 with authentication data stored in the memory 180, and then execute an application according to a comparison result. The processor 110 may execute a command or output corresponding image data to the display module 140, based on sensing data sensed by the input sensor 191-2 or the digitizer 191-3. In an example in which a temperature sensor is included in the sensor module 191, the processor 110 may receive temperature data about a temperature measured from the sensor module 191, and further perform luminance correction on image data, based on the temperature data.

The processor 110 may receive measurement data about existence of the user, a position of the user, eyes of the user, or the like from the camera module 171. The processor 110 may further perform luminance correction on image data, based on the measurement data. For example, the processor 110 which decides the existence of the user through an input from the camera module 171 may output image data of which luminance is corrected to the display module 140 through the data conversion circuit 112-2 or the gamma correction circuit 112-3.

At least some of the described components may be connected to each other and communicate signals (e.g., commands or data) therebetween through an inter-peripheral communication scheme, e.g., a bus, a general purpose input/output (GPIO), a serial peripheral interface (SPI), a mobile industry processor interface (MIPI), or an ultra path interconnect (UPI) link. The processor 110 may communicate with the display module 140 through an appointed interface, and use any one of the communication schemes described herein. However, the present disclosure is not limited to the communication schemes described herein.

The electronic device 101 in accordance with various embodiments disclosed in this document may become various types devices. The electronic device 101 may include, for example, at least one of a portable communication device (e.g., a smartphone), a computer device, a portable multimedia device, a portable medical device, a camera, a wearable device, and a home appliance. The electronic device 101 in accordance with an embodiment of this document is not limited to the devices described herein.

In the descriptions of the method and processes herein, the operations may be performed in a different order than the order shown and/or described, or the operations may be performed in different orders or at different times. Certain operations may also be left out of the flowcharts, one or more operations may be repeated, or other operations may be added. Descriptions that an element "may provide," is "configured to provide," "may sense," is "configured to sense," and the like include methods, processes, and techniques for implementing such techniques, operations, and the like in accordance with example aspects described herein.

In the electronic device, the display device, and the method of driving the display device in accordance with the present disclosure, the brightness and color coordinate of an image viewed by a user can be equally maintained even when the viewing angle of a user with respect to a display panel varies.

Example embodiments have been disclosed herein, and although specific terms are employed, the terms are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
    a processor configured to provide an input grayscale corresponding to an image;
    a display panel configured to display the image;
    an activity sensor configured to sense a current action of a user; and
    a viewing angle corrector configured to:
        determine a current viewing angle of the user with respect to the display panel, wherein the current viewing angle corresponds to the current action, and
        correct the input grayscale, based on the current viewing angle,
    wherein the viewing angle corrector corrects the input grayscale, using a first offset for correcting a brightness change according to the current viewing angle and a second offset for correcting a color coordinate change according to the current viewing angle.

2. The display device of claim 1, wherein:
    the first offset comprises a (1-1)th offset with respect to a first color, a (1-2)th offset with respect to a second color, and a (1-3)th offset with respect to a third color, and
    the second offset comprises a (2-1)th offset with respect to the first color, a (2-2)th offset with respect to the second color, and a (2-3)th offset with respect to the third color.

3. The display device of claim 2, wherein the display device is configured to:
    as a luminance of the first color at the current viewing angle becomes larger, decrease the (1-1)th offset at the current viewing angle,
    as a luminance of the second color at the current viewing angle becomes larger, decrease the (1-2)th offset at the current viewing angle, and
    as a luminance of the third color at the current viewing angle becomes larger, decrease the (1-3)th offset at the current viewing angle.

4. The display device of claim 3, wherein the display device is configured to:
    as a luminance of the first color when a viewing angle is 0 degrees becomes larger, increase the (1-1)th offset at the current viewing angle,
    as a luminance of the second color when the viewing angle is 0 degrees becomes larger, increase the (1-2)th offset at the current viewing angle, and
    as a luminance of the third color when the viewing angle is 0 degrees becomes larger, increase the (1-3)th offset at the current viewing angle.

5. The display device of claim 4, wherein the display device is configured to:
    as a luminance ratio of the first color in an entire luminance when the viewing angle is 0 degrees becomes larger, decrease the (2-1)th offset at the current viewing angle,
    as a luminance ratio of the second color in the entire luminance when the viewing angle is 0 degrees becomes larger, decrease the (2-2)th offset at the current viewing angle, and
    as a luminance ratio of the third color in the entire luminance when the viewing angle is 0 degrees becomes larger, decrease the (2-3)th offset at the current viewing angle.

6. The display device of claim 5, wherein the display device is configured to:
    as a luminance ratio of the first color in the entire luminance at the current viewing angle becomes larger, increase the (2-1)th offset at the current viewing angle,
    as a luminance ratio of the second color in the entire luminance at the current viewing angle becomes larger, increase the (2-2)th offset at the current viewing angle, and
    as a luminance ratio of the third color in the entire luminance at the current viewing angle becomes larger, increase the (2-3)th offset at the current viewing angle.

7. The display device of claim 1, wherein the viewing angle corrector comprises:
    a viewing angle determiner configured to determine the current viewing angle corresponding to the current action; and
    an offset determiner configured to calculate the first offset and the second offset, based on the current viewing angle, and determine a final offset, based on the first offset and the second offset.

8. The display device of claim 7, wherein:
    a plurality of representative viewing angles corresponding to a plurality of action groups are predetermined, and
    the viewing angle determiner is configured to determine, as the current viewing angle, a representative viewing angle corresponding to an action group to which the current action belongs.

9. The display device of claim 7, wherein the offset determiner determines, as the final offset, a value obtained by multiplying the first offset and the second offset.

10. The display device of claim 7, wherein the viewing angle corrector further comprises:
    a grayscale-voltage converter configured to convert the input grayscale into an input voltage value; and
    an offset applier configured to generate an output voltage value by applying the final offset to the input voltage value.

11. A method of driving a display device, the method comprising:
    sensing a current action of a user;
    determining a current viewing angle of the user with respect to a display panel, wherein the current viewing angle corresponds to the current action; and
    correcting an input grayscale of the display panel, based on the current viewing angle,
    wherein, in the correcting the input grayscale, the input grayscale is corrected, using a first offset for correcting a brightness change according to the current viewing angle and a second offset for correcting a color coordinate change according to the current viewing angle.

12. The method of claim 11, wherein:
the first offset comprises a (1-1)th offset with respect to a first color, a (1-2)th offset with respect to a second color, and a (1-3)th offset with respect to a third color, and
the second offset comprises a (2-1)th offset with respect to the first color, a (2-2)th offset with respect to the second color, and a (2-3)th offset with respect to the third color.

13. The method of claim 12, further comprising:
as a luminance of the first color at the current viewing angle becomes larger, decreasing the (1-1)th offset at the current viewing angle,
as a luminance of the second color at the current viewing angle becomes larger, decreasing the (1-2)th offset at the current viewing angle, and
as a luminance of the third color at the current viewing angle becomes larger, decreasing the (1-3)th offset at the current viewing angle.

14. The method of claim 13, further comprising:
as a luminance of the first color when a viewing angle is 0 degrees becomes larger, increasing the (1-1)th offset at the current viewing angle,
as a luminance of the second color when the viewing angle is 0 degrees becomes larger, increasing the (1-2)th offset at the current viewing angle, and
as a luminance of the third color when the viewing angle is 0 degrees becomes larger, increasing the (1-3)th offset at the current viewing angle.

15. The method of claim 14, further comprising:
as a luminance ratio of the first color in an entire luminance when the viewing angle is 0 degrees becomes larger, decreasing the (2-1)th offset at the current viewing angle,
as a luminance ratio of the second color in the entire luminance when the viewing angle is 0 degrees becomes larger, decreasing the (2-2)th offset at the current viewing angle, and
as a luminance ratio of the third color in the entire luminance when the viewing angle is 0 degrees becomes larger, decreasing the (2-3)th offset at the current viewing angle.

16. The method of claim 15, further comprising:
as a luminance ratio of the first color in the entire luminance at the current viewing angle becomes larger, increasing the (2-1)th offset at the current viewing angle,
as a luminance ratio of the second color in the entire luminance at the current viewing angle becomes larger, increasing the (2-2)th offset at the current viewing angle, and
as a luminance ratio of the third color in the entire luminance at the current viewing angle becomes larger, increasing the (2-3)th offset at the current viewing angle.

17. The method of claim 11, further comprising determining a final offset, based on the first offset and the second offset.

18. The method of claim 11, wherein:
a plurality of representative viewing angles corresponding to a plurality of action groups are predetermined, and
in the determining the current viewing angle, a representative viewing angle corresponding to an action group to which the current action belongs is determined as the current viewing angle.

19. The method of claim 17, wherein, in the determining the final offset, a value obtained by multiplying the first offset and the second offset is determined as the final offset.

20. An electronic device comprising:
an activity sensor comprising at least one sensor among a speed sensor, an acceleration sensor, a gyroscope, a gravity sensor, a heartbeat sensor, a geomagnetic sensor, a rotation vector sensor, a temperature sensor, a humidity sensor, an illuminance sensor, a direction sensor, a tilt sensor, and a camera module, wherein the activity sensor is configured to sense a current action of a user, using the at least one sensor;
a processor configured to provide an input grayscale corresponding to an image;
a display panel configured to display the image;
a viewing angle corrector configured to:
determine a current viewing angle of the user with respect to the display panel, wherein the current viewing angle corresponds to the current action,
correct the input grayscale based on the current viewing angle, and
provide an output grayscale or an output voltage value based on correcting the input grayscale; and
a data driver configured to generate a data voltage, using the output grayscale or the output voltage value, and provide the data voltage to the display panel,
wherein the viewing angle corrector corrects the input grayscale, using a first offset for correcting a brightness change according to the current viewing angle and a second offset for correcting a color coordinate change according to the current viewing angle.

* * * * *